(No Model.)
Z. M. HOWELL.
SIDE SPRING VEHICLE.
No. 305,193. Patented Sept. 16, 1884.
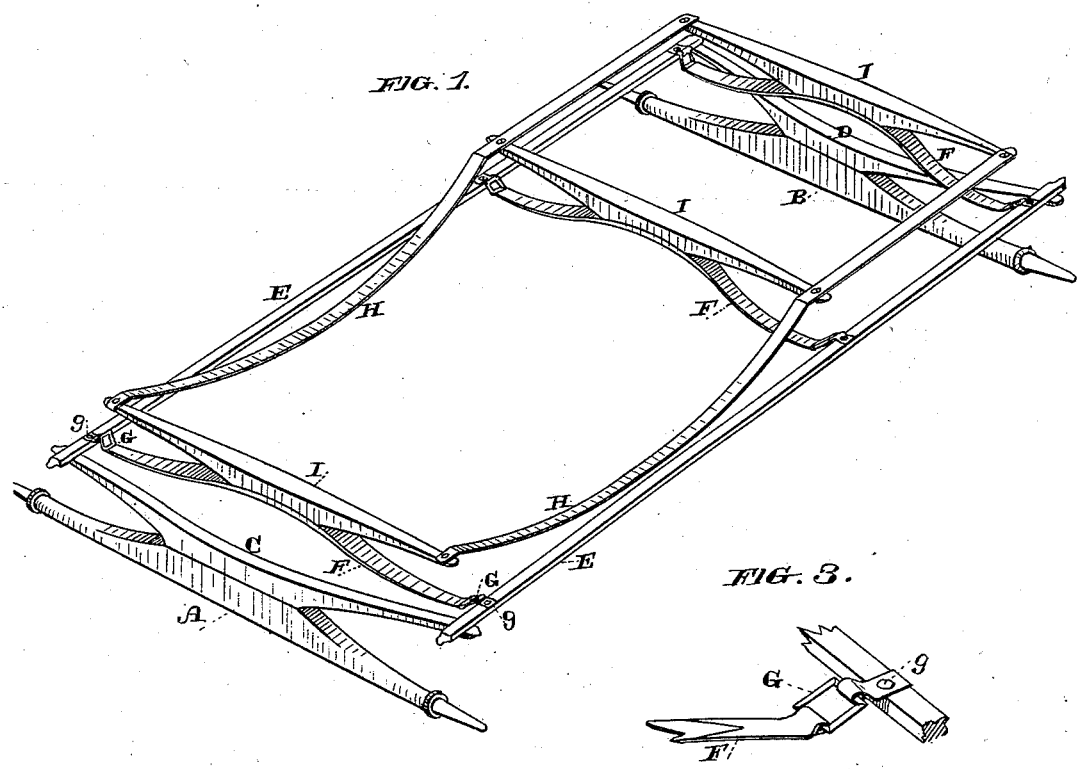

UNITED STATES PATENT OFFICE.

ZECHARIAH M. HOWELL, OF SALIDA, CALIFORNIA.

SIDE-SPRING VEHICLE.

SPECIFICATION forming part of Letters Patent No. 305,193, dated September 16, 1884.

Application filed March 5, 1884. (No model.)

*To all whom it may concern:*

Be it known that I, ZECHARIAH M. HOWELL, of Salida, county of Stanislaus, and State of California, have invented an Improvement in Vehicles; and I hereby declare the following to be a full, clear, and exact description thereof.

My invention relates to an improved vehicle; and it consists in a new and useful arrangement and connection of side bars or rails and body-supporting springs, as I shall hereinafter fully explain.

The object of my invention is to provide a simple frame for the attachment of the springs, and such an arrangement and connection of the springs therewith that, whether in a four or a two wheeled vehicle, they may possess that independence of movement which will enable them to remain unaffected by the unpleasant movement of the vehicle-frame derived from the jerking and jogging of the horse.

Referring to the accompanying drawings, Figure 1 is a perspective view of my vehicle frame and springs, showing two axles. Fig. 2 is a side view of same, showing a single axle. Fig. 3 shows manner of clipping springs to side bar.

A is the forward axle, and B the rear axle. C is the head-block on the forward axle, and D is the rear bolster on axle B.

Firmly bolted or clipped to the ends of the head-block and bolster are the side bars or rails, E, constituting the frame of the vehicle. In a vehicle having but one axle these side bars would be clipped directly to said axle, as shown in Fig. 2, at or near their centers, and extend back and forward, with any suitable arrangement of braces to strengthen them.

F represents three half-springs composed of a suitable number of leaves. The ends of these springs are connected with the side rails by means of links G, pivoted in said springs, and in suitable bearings, g, bolted to the side rails. Secured on the springs are the spring-bars I, on the ends of which the sills H of the body are bolted. The rear two spring-bars support the main portion of the body, and the front one supports its foot portion. Now, it will be seen that by this connection of the springs with the side rails the proper extension of the springs is provided for, and at the same time they are not so dependent upon the side rails as to receive the motion therefrom; but they may have their independent movement, the tendency of which, when a weight is in the vehicle, is to counteract the unpleasant motion and maintain as near as possible an equilibrium. This is especially true of a two-wheeled vehicle, in which the jogging of the horse is communicated directly to the vehicle and produces a rocking which renders this class of conveyances undesirable for pleasure; but with this arrangement the motion is not transmitted, and the body may remain perfectly steady.

Having thus described my invention, what I claim as new, and desire to secure by Letters Patent, is—

In a vehicle, and in combination with the front and rear axles, A B, each provided with bolsters, the sills H, curved a portion of their length, and having their front and rear ends secured to spring-bars I, the side bars, E, springs F, and an intermediate spring and bar secured to the side bars and sills, all constructed to operate substantially as herein set forth.

In witness whereof I have hereunto set my hand.

ZECHARIAH M. HOWELL.

Witnesses:
S. W. COFFEE,
H. C. MARTER.